Sept. 19, 1967    C. H. McCREARY    3,342,170
CONDENSATE SCAVENGING ARRANGEMENT
Filed Nov. 1, 1965

INVENTOR.
Charles H. McCreary
BY
J. L. Carpenter
ATTORNEY

# United States Patent Office 3,342,170
Patented Sept. 19, 1967

3,342,170
CONDENSATE SCAVENGING ARRANGEMENT
Charles H. McCreary, Oak Park, Ill., assignor to General Motors Corporation, Detroit, Mich., a corporation of Delaware
Filed Nov. 1, 1965, Ser. No. 505,884
7 Claims. (Cl. 123—182)

ABSTRACT OF THE DISCLOSURE

A condensate scavenging arrangement for a diesel engine wherein a normally open valve, interposed in a passage between the combustion chambers and the atmosphere, gradually closes in response to pressure built up in the fuel system when the engine is started thereby allowing accumulated liquid to be ejected from the combustion chamber prior to normal operation of the engine.

Diesel engines are commonly provided with cylinder test valves at each cylinder through which condensate is removed from the combustion chambers prior to starting. This allows the removal of any accumulated liquids, such as fuel, water or lubricating oil, which may have collected within the cylinders while the engine was shut down. If such an arrangement is not provided, liquid accumulations sometimes result in a "hydraulic lock," causing the piston or cylinder to break or the connecting rod to bend. Normal starting procedure for such an engine requires the manual opening of each cylinder test valve, rotation of the engine to eject any accumulated liquid, and the manual closing of each cylinder test valve. The fuel pump may then be turned on and the engine started. Such a procedure is necessarily time consuming, particularly for large 16 cylinder engines, and in many instances individuals will start the engine without this pre-servicing procedure. This often results in a damaged engine.

The present invention provides an automatically operated cylinder test valve which obviates the necessity of manually opening and closing the valve. In the preferred embodiment of the invention the cylinder test valve includes a fluid pressure controlled valve which is normally open to allow the ejection of condensate from the cylinder. When the engine is operating, pressure fluid, such as fuel, closes the valve and seals the cylinder. The invention ensures that the valve will fully close. This is important because a very slight blow-by of hot exhaust gases will rapidly destroy the valve and its seat.

One feature of this invention is that it provides an improved condensate scavening arrangement for the removal of condensate from the cylinders of diesel engines. Another feature is that the arrangement includes automatically operated cylinder test valves which eliminate the possibility of engine damage due to failure to eject accumulated condensate from the cylinders.

A further feature is that the valves are operated by engine fuel system pressure.

Yet another feature is that exhaust gas leakage due to insufficient valve closing is eliminated.

These features will be apparent from the following description taken in conjunction with the accompanying drawing wherein.

Figure 1:
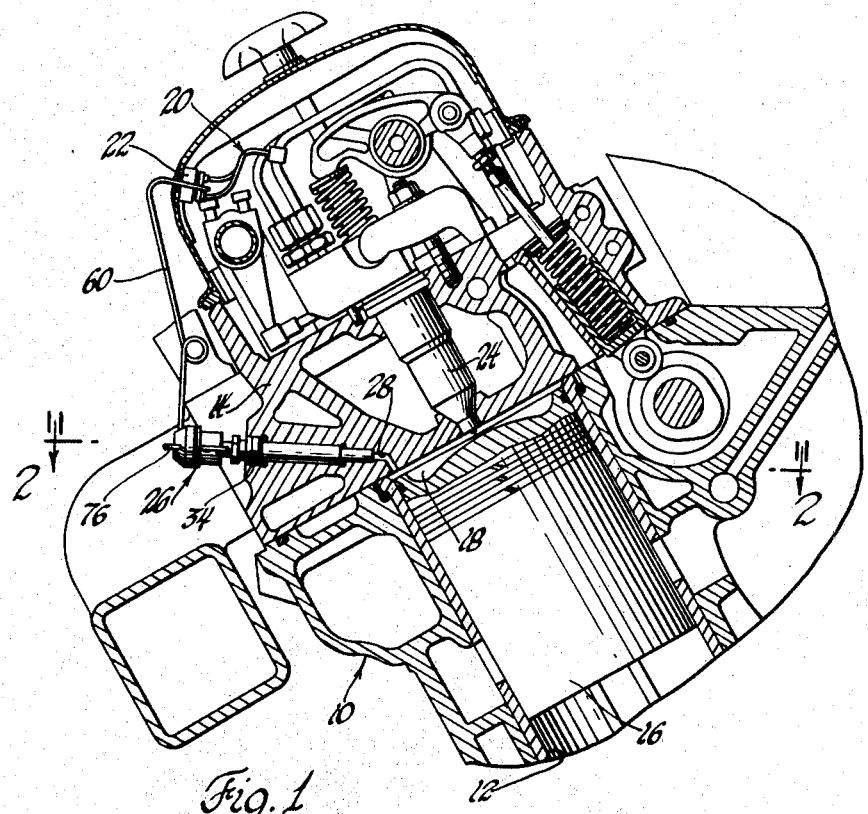
FIGURE 1 is a partially broken away view of a portion of a diesel engine embodying a condensate scavening arrangement according to this invention.

Referring to FIGURE 1, there is shown a portion of a conventional diesel engine 10 which includes a cylinder 12 and cylinder head 14. A piston 16 is reciprocably movable within the cylinder and with the cylinder head defines a combustion chamber 18. A conventional fuel system 20 includes a source of pressurized fuel, a fuel manifold 22 and a fuel injector 24. A condensate scavenging arrangement according to this invention includes a plurality of cylinder test valves 26 mounted in the cylinder head and communicating with the combustion chambers through the passages 28 in the cylinder head. Each cylinder has a cylinder test valve; however, since they are all identical, only one is herein illustrated and described.

Figure 2:
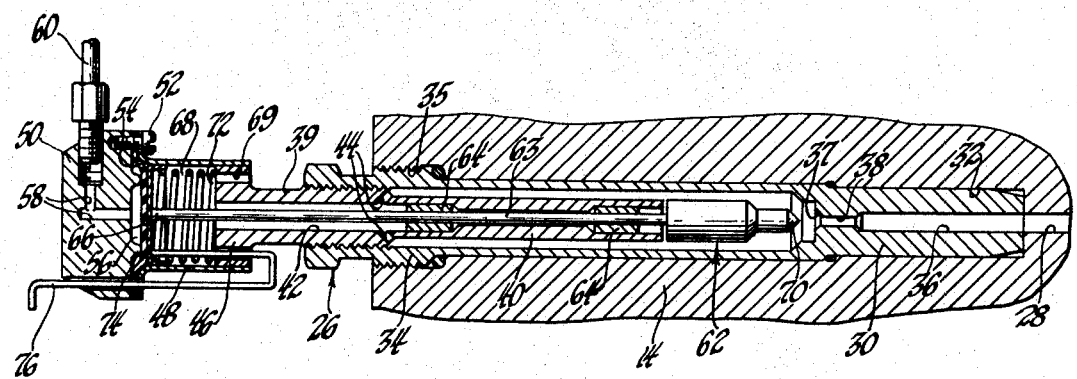
FIGURE 2 is an enlarged sectional view taken generally along the plane indicated by line 2—2 of FIGURE 1 showing the valve in open position.

The cylinder test valve 26, as best seen in FIGURE 2, includes a valve body or sleeve member 30 which fits within a shouldered bore 32 in the cylinder head and has the threaded portion 34 thereof threaded within a threaded portion 35 of bore 32. The sleeve has a passage 36 therethrough of variable cross-section which opens to the passage 28. A valve seat 37 is located circumjacent a reduced diameter portion 38 of the passage 36. An insert member 39 is threaded into the outer end of the sleeve member and has a portion 40 which extends into an enlarged portion of the passage 36. A passage 42 within member 39 communicates with the passage 36 through the angularly directed openings or passages 44. The head portion 46 of the member 39 is secured within a flanged sleeve 48 which is bolted to a connector block 50 at 52. A diaphragm 54 of resilient material is held about its periphery between the sleeve 48 and the connector block 50 and defines a pressurizable chamber 56 with the connector block. Passages 58 in the connector block connect the chamber 56 through the conduit 60 to the fuel system manifold 22. A valve assembly 62 includes an elongated stem 63 supported within the insert member 39 by sleeve bearings 64. A piston 66 is attached to one end of the stem and defines a chamber 68 with the head portion 46 and sleeve 48. The chamber is open to the atmosphere through the passages 69. A valve plunger 70 at the opposite end of the stem is biased off the valve seat 37 by the spring 72 which seats against the head portion 46 and piston 66 to bias the piston against the diaphragm 54 and seat the diaphragm against an annular rib 74 of block 50.

When the engine is not in operation the cylinder test valve is open as shown in FIGURE 2. If it is desired to service the engine, the crankshaft may be rotated and any liquid in the combustion chamber will be ejected through the test valve as the piston 16 reaches the top of its stroke. The flow path is through the passage 28 and into the sleeve passage 36, through the openings 44 into the insert passage 42, into the chamber 68 and out the passage 69. The engine is rotated as long as liquid is being ejected through the test valve.

Figure 3:
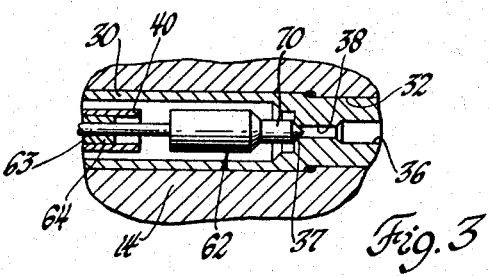
FIGURE 3 is a partial view similar to FIGURE 2 showing the valve in closed position.

The engine, however, may be started without pre-servicing since the valve operation is automatic. When started, fuel pressure gradually builds up within the fuel system 20 and the chamber 56. The fuel pressure against the diaphragm 54 moves the piston 66 within the chamber 68 against the action of spring 72. The piston movement seats valve plunger 70 on the valve seat 37, as shown in FIGURE 3, to block the passage 36. Fuel pressure sufficient to compress the spring and seat the valve plunger is not instantaneous, however, and any liquid in the combustion chamber will be ejected through the test valve as the engine is started and pressure is built up in chamber 56. The time required to reach normal operating pressure is sufficient to allow potentially harmful accumulations of liquid to be ejected. At normal engine operating pressure, the valve plunger is held against the valve seat to prevent the escape of exhaust gases through the cylinder test valve.

A valve position indicator 76 is attached to the piston 66 and movable with the valve assembly 62. By observing the indicator, the operator can tell whether the valve is open or closed. A conventional flow sensing valve may be connected into the system to monitor fuel flow to the cylinder test valve. If a malfunction occurs causing an excessive flow of fuel, the sensing valve automatically closes until the malfunction has been corrected.

Thus, this invention provides an improved condensate scavenging arrangement.

I claim:

1. A condensate scavenging arrangement for a diesel engine having a pressurized fuel system and a combustion chamber comprising valve means interposed in a passage connecting the combustion chamber to the atmosphere and having a normally open position, and fuel pressure responsive means operatively connected to said valve means and said fuel system and operating said valve means to close said passage as pressure is built up in the fuel system when the engine is started.

2. The invention as recited in claim 1 wherein said fuel pressure responsive means includes means for operating said valve means to gradually close said passage as pressure is built up in the fuel system.

3. The invention as recited in claim 2 wherein said fuel pressure responsive means includes a piston assembly.

4. The invention as recited in claim 3 wherein said fuel pressure responsive means includes a diaphragm in communication with the fuel system and being expandable against the piston assembly as pressure is built up in the fuel system.

5. The invention as recited in claim 4 wherein said piston assembly is spring biased against the diphragm.

6. The invention as recited in claim 4 wherein said valve means is spring biased to said normally open position.

7. A condensate scavenging arrangement for a diesel engine having a pressurized fuel system and a combustion chamber comprising valve means interposed in a passage connecting the combustion chamber to the atmosphere, a piston assembly operatively connected to said valve means, a flexible diaphragm in communication with the fuel system and being expandable against said piston assembly by the fuel pressure of the fuel system, spring means biasing said piston assembly against the diaphragm and biasing said valve means in an open position, said diaphragm and said piston operating said valve means against said spring means to gradually close said passage in response to pressure build-up in the fuel system as the engine is started.

References Cited

UNITED STATES PATENTS

| 2,137,482 | 11/1938 | Gil | 123—182 |
| 2,922,436 | 1/1960 | Brash | 123—182 X |
| 3,220,392 | 11/1965 | Cummins | 123—978 |

FOREIGN PATENTS

| 1,266,322 | 5/1961 | France. |
| 102,185 | 11/1916 | Great Britain. |
| 745,714 | 2/1956 | Great Britain. |

MARK M. NEWMAN, *Primary Examiner.*

WENDELL E. BURNS, *Examiner.*